No. 615,493. Patented Dec. 6, 1898.
F. H. RICHARDS.
AUTOMATIC WEIGHING MACHINE.
(Application filed Nov. 26, 1897.)
(No Model.)
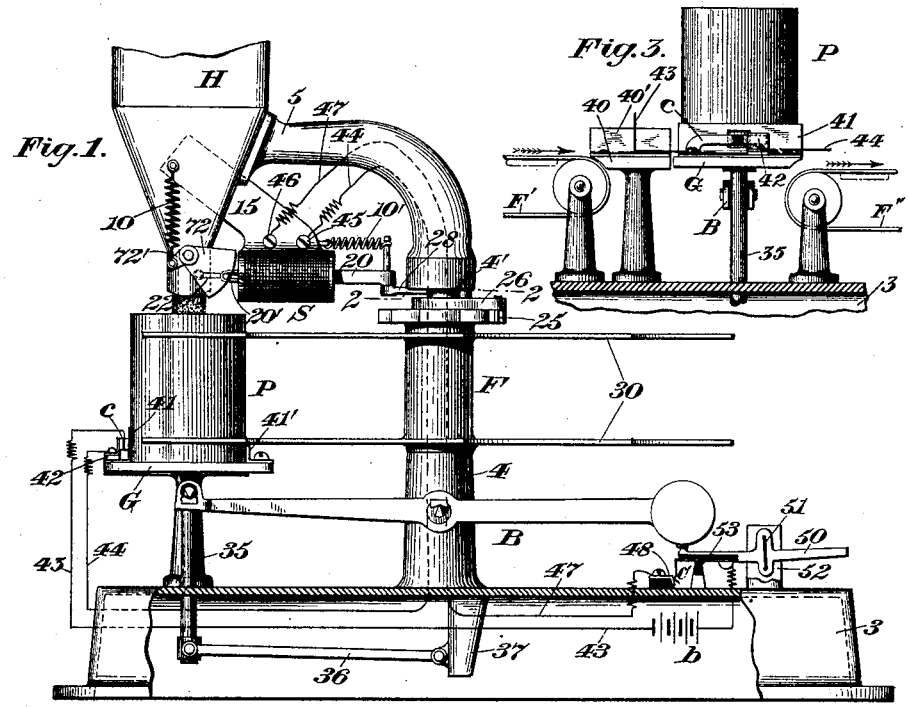
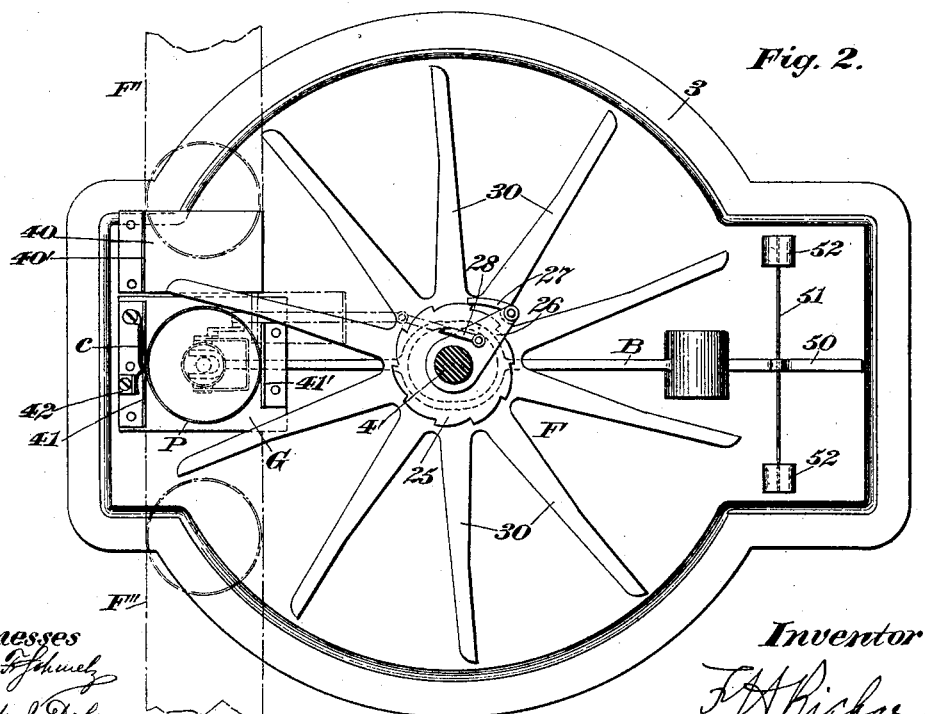
Witnesses
Chas. F. Schmelz
Fred. J. Dole.
Inventor
F. H. Richards

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 615,493, dated December 6, 1898.

Application filed November 26, 1897. Serial No. 659,838. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines, and especially to automatic weighing-machines for weighing predetermined quantities of granular or similar material; and it has for its main object the provision of an improved machine of this type especially adapted for weighing small quantities of material into suitable packages—such as cans, boxes, and other receptacles—supported on the weighing means or beam mechanism of the machine.

One of the main objects of this invention is to provide a machine of this type in which the opening movement of the stream-controlling means or valve mechanism for supplying material to the package or can will be blocked unless the receiving vessel or package is properly positioned on the weighing mechanism, and for the purpose of preventing the improper operation of the machine I prefer to make use of electrically-operated means governed by a suitable circuit-controller, the position of which will be determined directly by the package into which a charge is to be delivered. In the preferred construction this circuit-controller will project into the path of the can, and the latter will be suitably guided on the load-receiver of the weighing mechanism in at least one direction, so as to coöperate properly with such circuit-controller. Ordinarily I will employ a pair of parallel guides spaced at an interval equal to the outside diameter of the package or can to be filled, and this package, when it is brought to its proper position between the guides, will shift the circuit-controller, and thereupon the valve mechanism will be operated to open a suitable valve and permit material to flow into the receiving-package until the latter is full. For the purpose of effecting the closure of this valve when the weighing mechanism, with a filled package, reaches the poising-line, I have provided also an additional circuit-controller, which will usually break the circuit controlling the valve when the beam mechanism reaches such poising position, these two circuit-controllers being preferably included in a single circuit and coacting in such a manner as to control conjointly the opening of the valve and prevent said opening unless both of the breaks in the circuit are closed.

The load-receiver, on which the packages will be carried while receiving material from a suitable supply spout or hopper, may advantageously be substantially flat, and in connection therewith I make use of package-feeding means for shifting packages successively and intermittently onto and off from such flat receiver.

In the construction illustrated the empty cans or packages will be upheld by a suitable support the upper face of which will be in the plane of the flat load-receiver when the latter is in its counterpoised position, and the filled packages or cans will be delivered onto a support the upper face of which is in the plane of the package-carrier when the latter is substantially in its poising position. Usually these two supports will be in the form of endless traveling belts, the one for advancing the empty packages to the weighing mechanism and the other constituting a discharge-belt for carrying away the filled packages.

In connection with the two feed-belts just described I prefer to make use of an intermittently-operative package-feeder preferably in the form of a rotary feed-wheel having package-actuating arms radiating therefrom and equidistant from one another, this feed-wheel being rotated in such a manner as to simultaneously shift an empty box onto the load-receiver or scale-pan of the weighing mechanism and shift the filled box off from such scale-pan and onto the discharge-belt or support just described.

An important feature of this invention is the employment of a novel form of poising device of the type shown in prior patents granted to me, the function of this poising device being to compensate for the small amount of material in the air at the time the supply of material is finally cut off by the valve mechanism. In this case the poising device is so constructed and so organized with respect to the main portion of the weighing mechanism as to have a gradually-decreasing efficiency from the beginning to the end of the interval of time during which it is shifted with respect to the main weighing mechanism. In order to provide for this, the poising device is preferably torsionally pivoted in such a manner as to bear upon the beam mechanism with a gradually-decreasing effect as the latter travels from the beginning of its range of movement toward the poising-line, the poising device being so mounted as to exert practically no pressure upon such beam mechanism when the poising-line is reached. It will be apparent that when the pressure of a poising device of this type is removed gradually from a weighing mechanism instead of such pressure being removed all at once the action of the beam mechanism will be much more sensitive and the package to be filled will be more accurately balanced than would be the case if the entire pressure of the poising device should be suddenly removed.

In the drawings accompanying and forming part of this specification, Figure 1 is a side elevation, with parts removed, of a weighing-machine constructed in accordance with my present improvements. Fig. 2 is a horizontal sectional plan of the same, the section being taken in line 2 2, Fig. 1; and Fig. 3 is a detail front view of the box-operated circuit-controller and of the feed and discharge belts.

Similar characters designate like parts in all the figures of the drawings.

The framework by means of which the several operative parts of my improved weighing-machine may be supported will be of any suitable type. That shown herein embodies as its essential features a preferably hollow and substantially circular base or bed 3 and a column 4, rising therefrom and having a reduced cylindrical stud or support for a rotary package-feeder, which will be described in detail hereinafter. At the extreme upper end of this reduced portion 4' of the column 4 an overhanging arm, such as 5, may be secured in any suitable manner, and to the outer end of this arm may be attached stream-supplying means of any usual type—such, for example, as the supply spout or hopper H.

The supply of the material from the hopper H may be controlled in any suitable or preferred manner; but in this instance I make use of a swinging supply-valve having its axis of oscillation passing through the stream of material issuing from the chute, this valve being indicated by 72. Normally this valve will tend to close, and the closing movement thereof may be effected in any well-known manner—as, for example, by means of a strong spring, such as 10, secured at one of its ends to a fixed point on the supply-spout and at its other end to a rock-arm 72', movable in unison with the main valve. For the purpose of actuating this valve to open the same I prefer to employ electrical operating means, and in this case I have shown depending from the supply-spout H a bracket or hanger 15, supporting at the lower end thereof a solenoid, such as S, by means of which the valve will be opened through suitable connections. These connections may comprise a core, such as 20, slotted at that end thereof which is adjacent to the valve 72 and connected with said valve by means of a suitable link, such as 22. The open end or eye of the core 20 is shown clearly herein at 20'. It will be noticed that as the spring 10 is connected with the main valve and the latter is in turn connected with the core of the solenoid said core will of course be retracted part way by said spring when the coils of the solenoid are deënergized; but as it is intended that the core shall have a movement substantially twice that of the valve a second spring is shown at 10' for continuing the movement of the core through the second half of its throw.

The rotary package-feeder, which is mounted on the main column 4 and has been hereinbefore referred to, is designated in a general way by F, and it embodies in the preferred construction one or more circuits of equidistant package-actuating arms, such as 30, usually disposed substantially radially relatively to the axis of rotation of said feeder, the interval between each pair of arms being sufficient to permit a package to be received between each pair and carried along freely thereby. In the construction illustrated two sets of these radial arms or blades are shown disposed in parallelism with each other, so positioned as to engage packages, such as those indicated herein at P, at the upper and lower ends of each package, and thereby control positively the movements of the latter. This feeder will preferably rotate intermittently and may operate in any suitable manner. In this instance, however, its intermittent movements are controlled by the core 20 of the solenoid by which the valve is operated, and for the purpose of effecting these intermittent movements I make use of a pawl-and-ratchet-wheel connection such as that illustrated in the drawings. Usually it will comprise a ratchet-wheel 25, fixed on the feeder F, and on the stud 4' of the column 4 may be mounted loosely a rock-arm 26, carrying a pawl 27, the rock-arm 26 being oscillated by means of a link 28, pivotally connected with the core 20 of said solenoid. It will be clear that as the solenoid is deënergized the valve will be closed by its spring 10 and that simultaneously therewith the core 20 will also be pulled forward by its spring 10' and the actuating-pawl will be brought into engagement with the next tooth of the ratchet-wheel. After the valve has fully closed the core still continues to advance under the stress of the spring 10', the loop 20' passing freely over the ends of the link 22, and the pawl, being in engagement with the next tooth of the ratchet-wheel, as just stated, thereupon acts to rotate the feeder F and advance another empty can beneath the feed-hopper H.

The weighing mechanism may be of any suitable type and will preferably embody as the principal feature thereof beam mechanism such as that indicated herein at B, which represents a single counterweighted beam supporting on the poising side thereof a pivotally-mounted substantially flat load-receiver or scale-pan, such as G, both the receiver and the beam mechanism being supported in this case by suitable knife-edge pivots.

In order to maintain the load-receiver in a vertical position, it may have depending from the center thereof a supporting rod or arm, such as 35, the movements of the lower end of which may be controlled by means of a guide-link, such as 36, connected with a suitable member, such as 37, on the framework.

In the machine illustrated it is intended that the packages or cans shall be fed to and away from the weighing mechanism by suitable devices, and in the preferred construction I have shown a pair of endless feed-belts, such as F' and F''', the former of which constitutes a load-advancing belt for delivering empty boxes to the weighing mechanism and the latter a package-discharging belt for carrying the filled packages away from the machine. The upper run of the belt F' is preferably in the same plane as the supporting-face of the flat load-receiver G when the latter is in its counterpoised position, and the carrying-face of the other belt F''' is in the same plane substantially as the said upper face of the receiver G when the latter is in its poising position. It will be evident that by employing this organization of the parts an empty can may be delivered onto the receiver G by a movement in one plane and that the filled can may be discharged onto another support by a movement of the can in another plane while the can is advancing in a given direction.

It will be clear that the rotary feed device hereinbefore described constitutes a means for intermittently shifting the empty and filled cans onto and off from the scale-pan G, as the belts F' and F''' would not alone be sufficient ordinarily for this purpose.

For supporting the belt F' and preventing sagging as the empty cans are delivered to the scale-pan I may employ in connection with the upper run of said belt a suitable support, such as 40, one side of which may have a guide 40', against which the packages or cans will engage when they are advanced by the action of the rotary feed-wheel. Moreover, the scale-pan or load-receiver itself may have thereon suitable means for guiding the packages or cans and positively locating them while they are being filled. I prefer to employ for this purpose a pair of parallel guides, such as 41 and 41', disposed adjacent to opposite sides of the scale-pan and separated by an interval substantially equal to the external diameters of the cans to be filled, this construction being one which will serve to prevent improper positioning of a package to be filled with material delivered from the supply-spout.

In connection with the scale-pan or load-receiver and its guides I employ a blocking device in the form of a circuit-controller for governing the operation of one or more of the movable parts of the apparatus, and this circuit-controller constitutes one of the most important features of these improvements. Said circuit-controller is indicated by $c$ and is controlled in its movements by the packages or cans to be filled. In the preferred construction it projects into the path of a package or can between the guides 41 and 41', through an opening in the guide 41, in such a manner that when the can is advanced into position on the scale-pan G by the combined action of the feed-belt F' and the rotary feed-wheel F the can will shift the circuit-controller and cause the latter to make contact with a circuit-terminal, such as 42, to which one wire of a circuit is connected, the other wire of the circuit being connected, of course, to the circuit-controlling arm itself. In this case a conductor 43 passes from a suitable source of energy, such as a battery $b$, and is connected at its opposite end to the circuit-controller $c$, the conductor from the contact-terminal 42 being indicated herein by 44 and passing to one terminal 45 of the solenoid S, from the other terminal 46 of which proceeds a conductor 47 to a contact-terminal 48, supported on and insulated from a suitable fixed portion of the framework. This last-mentioned terminal is governed by a circuit-controller, such as $c'$, operated by a poising device, which has been hereinbefore referred to, for compensating for the amount of material in the air when the valve 72 is closed.

The poising device that I have illustrated is of novel construction and embodies as its essential feature a balanced member or lever, such as 50, supported by a torsion-pivot in such a manner as to tend always to assume a normal or horizontal position. This torsion-pivot may be formed by means of a strip of thin steel or similar material somewhat narrow though of sufficient width to permit the necessary range of movement of the poising device. The lever 50 may be secured to this band or strip 51 in any suitable manner and will of course in the construction illustrated be held normally in a substantially horizontal position. The supports by which the ends of the torsion strip or spring, which forms a pivot for the poising device, are held are indicated by 52.

The poising device is intended to coact with the circuit-controller $c$ to control conjointly therewith the circuit through the battery $b$, and for this purpose it may carry thereon the circuit-controller $c'$, which has been referred to hereinbefore. This circuit-controller $c'$ will preferably be insulated from the arm 50 of the poising device, and the latter may be limited in its movements in one direction by means of an insulated stop, such as 53, with which the contact-maker $c'$ may come in contact.

Of course the poising device constitutes a part of the poising portion of the weighing mechanism when the beam mechanism is in its counterpoised position, and, although it is pivoted on the framework at a point separated from the pivotal point of the beam B and is mounted independently of the main weighing mechanism, it will be clear that its force is exerted in opposition to the counterweight of the main beam mechanism and normally increases the poising effect of the weighing mechanism and correspondingly decreases the counterpoising effect. When such poising device is released on the poising of the beam mechanism, the force exerted by the poising device is not removed from the weighing mechanism all at once, but is taken off gradually, owing to the fact that the resilient band 51 exerts a gradually-decreasing torsional force as it returns from the position shown in Fig. 1 to a balanced position clear of the main weighing mechanism. Hence a more sensitive action of the weighing mechanism is secured by the use of this poising device than if such device were shifted entirely out of operative relation with the beam mechanism on the poising of the latter and its total effect subtracted from the total poising effect of the weighing mechanism considered as a whole.

The operation of a weighing-machine constructed in accordance with my present improvements, as illustrated in the drawings of this application, is as follows: It being understood that the parts are in the positions shown in Fig. 1, with the valve wide open and delivering material into the can or package P, it will be clear that the loading operation will continue until the poising-line of the weighing mechanism is reached, whereupon the poising device will come to a balanced position, owing to the withdrawal of the main beam B from engagement therewith, and the circuit will be broken by the contact-breaker $c'$. As soon as this circuit is broken the solenoid will be deënergized and the spring 10 will return the valve 72 to a closed position, the valve being almost entirely shut by the action of this spring, and the connecting-link 22 being operated to return the core 20 to its normal position. As the core of the solenoid is retracted by the springs 10 10' the pawl 27, engaging the tooth of the ratchet-wheel 25, will turn the latter, and hence the feed-wheel F, to permit the feeder to carry away the filled package or can and simultaneously advance an empty one onto the scale-pan G. Obviously as soon as the filled package or can is removed in this manner the circuit will be broken at $c$ and will not be reëstablished until another empty can is in position on the scale-pan, and hence the circuit to the solenoid for operating the valve to open the latter will not be completed until another or empty can is in place. The belt F″ may operate continuously; but it is preferable to have the belt F′ move intermittently in accordance with the movements of the feed-wheel F. When the circuit is completed again by the placing of an empty can in position, the circuit will be reëstablished and the valve will open, and at the same time the pawl 27 will be returned to a position for engaging another tooth of the ratchet-wheel, it being understood that this pawl sweeps over two teeth of the ratchet-wheel when so returned.

Having described my invention, I claim—

1. In a weighing-machine, the combination, with stream-supplying means and with stream-controlling means, of weighing mechanism including a load-receiver; a pair of feeders disposed, respectively, at opposite sides of the load-receiver and located in different planes; and a package-feeder constructed and operable to remove a package from one of the feeders and supply it to the load-receiver, and for subsequently removing the said package from the load-receiver and supplying it to the other feeder.

2. In a weighing-machine, the combination, with stream-supplying means and with stream-controlling means, of weighing mechanism embodying a substantially flat load-receiver; an endless package-advancing feeder having its upper run substantially in the plane of the load-receiver when the latter is in its counterpoised position; an endless package-discharging feeder having its upper run substantially in the plane of the load-receiver when the latter is in its poising position; and intermediate feeding means between said endless feeders.

3. In a weighing-machine, the combination, with stream-supplying means and with stream-controlling means, of weighing mechanism embodying a substantially flat load-receiver; a pair of package-supports at opposite sides of the load-receiver and disposed, respectively, in the counterpoising and poising planes of the load-receiver; and a rotary package-feeder having equidistant package-feeding arms, said rotary package-feeder being adapted to remove an empty package from one of the package-supports at one point of the operation of the machine and to supply it to said load-receiver, and at another point in said operation to remove the filled package and to supply it to the other package-support.

4. In a weighing-machine, the combination, with stream-supplying means and with stream-controlling means, of weighing mechanism embodying a substantially flat load-receiver and disposed, respectively, in the counterpoising and poising planes of the load-receiver; and an intermittently-operative package-feeder having equidistant radial package-feeding arms, said rotary package-feeder being adapted to remove an empty package from one of the package-supports at one point of the operation of the machine and to supply it to said load-receiver, and at another point in said operation to remove the filled package and to supply it to the other package-support.

5. In a weighing-machine, the combination, with a support, of weighing mechanism embodying counterpoised main weighing means, and a poising device shiftable off from the weighing mechanism and having a decreasing efficiency during such shifting movement.

6. In a weighing-machine, the combination, with a support, of weighing mechanism embodying counterpoised main weighing means, and a poising device coöperative with the counterpoised side of the main weighing means and shiftable off from the weighing mechanism and having a decreasing efficiency during such shifting movement.

7. In a weighing-machine, the combination, with a support, of weighing mechanism embodying counterweighted beam mechanism and a poising device each pivoted at a different point on said support, said poising device being shiftable off from the weighing mechanism and having a decreasing efficiency during such shifting movement.

8. In a weighing-machine, the combination, with a support, of weighing mechanism embodying counterpoised main weighing means, and a torsionally-pivoted poising device shiftable off from the weighing mechanism and having a decreasing efficiency during such shifting movement.

9. In a weighing-machine, the combination, with stream-supplying means and with stream-controlling means, of weighing mechanism embodying a package-carrier, and a blocking device governed by a package on the placing of the latter in position on the package-carrier.

10. In a weighing-machine, the combination, with stream-supplying means and with stream-controlling means, of weighing mechanism embodying a package-carrier, and an electrical circuit-controller governed by a package on the placing of the latter in position on the package-carrier.

11. In a weighing-machine, the combination, with stream-supplying means and with stream-controlling means, of weighing mechanism embodying a package-carrier, and an electrical circuit-controller governed by a package on the placing of the latter in position on the package-carrier, and governing the operation of the stream-controlling means.

12. In a weighing-machine, the combination, with stream-supplying means and with stream-controlling means, of weighing mechanism embodying a package-carrier, and an electrical circuit-controller carried by the weighing mechanism and governed by a package on the placing of the latter in position on the package-carrier.

13. In a weighing-machine, the combination, with stream-supplying means and with stream-controlling means, of weighing mechanism embodying a package-carrier and an electrical circuit-controller carried by the load-receiver and governed by a package on the placing of the latter in position on the package-carrier.

14. In a weighing-machine, the combination, with stream-supplying means and with stream-controlling means, of weighing mechanism embodying a package-carrier; package-feeding means for advancing a package onto the package-carrier; and an electrical circuit-controller governed by a package on the placing of the latter in position on the package-carrier.

15. In a weighing-machine, the combination, with stream-supplying means and with stream-controlling means, of weighing mechanism embodying a package-carrier; a rotary package-feeder for advancing a package onto the package-carrier; and an electrical circuit-controller governed by a package on the placing of the latter in position on the package-carrier.

16. In a weighing-machine, the combination, with stream-supplying means and with stream-controlling means, of weighing mechanism embodying a package-carrier; an intermittently-operative rotary package-feeder for advancing a package onto the package-carrier; and an electrical circuit-controller governed by a package on the placing of the latter in position on the package-carrier.

17. In a weighing-machine, the combination, with stream-supplying means and with stream-controlling means, of weighing mechanism embodying a package-carrier; an endless package-feeder and an intermittently-operative rotary package-feeder coöperative for advancing a package onto the package-carrier; and an electrical circuit-controller governed by a package on the placing of the latter in position on the package-carrier.

18. In a weighing-machine, the combination, with stream-supplying means and with stream-controlling means, of weighing mechanism embodying a package-carrier; feeding means for advancing a package onto the package-carrier; and an electrical circuit-controller governed by a package on the placing of the latter in position on the package-carrier, said circuit-controller governing the operation of the stream-controlling means and the package-feeding means.

19. In a weighing-machine, the combination, with stream-supplying means and with stream-controlling means, of weighing mechanism embodying a package-carrier; an intermittently-operative package-feeder for advancing a package onto, and afterward shifting it off from, the package-carrier; and an electrical circuit-controller governed by a package on the placing of the latter in position on the package-carrier.

20. In a weighing-machine, the combination, with stream-supplying means and with stream-controlling means, of weighing mechanism embodying a package-carrier; an intermittently-operative package-feeder for advancing a package onto the package-carrier; an electric circuit including a solenoid for operating the stream-controlling means and the package-feeder; and a circuit-controller in said circuit and governed by a package on the placing of the latter in position on the package-carrier.

21. In a weighing-machine, the combination, with stream-supplying means and with stream-controlling means, of weighing mechanism embodying a package-carrier; package-guiding means for positively locating a package on said package-carrier; and an electrical circuit-controller coöperative with said package-guiding means and governed by a package on the placing of the latter in position on the package-carrier.

22. In a weighing-machine, the combination, with stream-supplying means and with stream-controlling means, of weighing mechanism embodying a package-carrier having package-guiding means thereon for positively locating a package, and an electrical circuit-controller coöperative with said package-guiding means and governed by a package on the placing of the latter in position on the package-carrier.

23. In a weighing-machine, the combination, with stream-supplying means and with stream-controlling means, of weighing mechanism embodying a package-carrier having a pair of parallel guides for engaging and locating a package, and a package-operated electrical circuit-controller normally projecting into the space between said guides.

FRANCIS H. RICHARDS.

Witnesses:
F. N. CHASE,
JOHN O. SEIFERT.